United States Patent
Reinders (10) Patent No.: US 8,191,872 B2
(45) Date of Patent: Jun. 5, 2012

(54) HEAT EXCHANGE LAMINATE

(75) Inventor: Johannes Antonius Maria Reinders, Warnsveld (NL)

(73) Assignee: Oxycom Beheer B.V., Raalte (NL)

( * ) Notice: Subject to any disclaimer, the term of this patent is extended or adjusted under 35 U.S.C. 154(b) by 1207 days.

(21) Appl. No.: 10/575,761

(22) PCT Filed: Oct. 18, 2004

(86) PCT No.: PCT/EP2004/011833
§ 371 (c)(1),
(2), (4) Date: May 8, 2007

(87) PCT Pub. No.: WO2005/040693
PCT Pub. Date: May 6, 2005

(65) Prior Publication Data
US 2008/0042306 A1    Feb. 21, 2008

(30) Foreign Application Priority Data

Oct. 17, 2003    (GB) .................................. 0324348.2

(51) Int. Cl.
*B01F 3/04* (2006.01)
(52) U.S. Cl. ........................ 261/153; 261/104; 261/156
(58) Field of Classification Search .................. 261/101, 261/104, 153, 154, 156, 157, DIG. 43
See application file for complete search history.

(56) References Cited

U.S. PATENT DOCUMENTS

| | | | |
|---|---|---|---|
| 3,683,591 A * | 8/1972 | Glav | ................................. 95/93 |
| 4,002,040 A * | 1/1977 | Munters et al. | ................. 62/121 |
| 4,461,733 A | 7/1984 | Otterbein | |
| 4,544,513 A | 10/1985 | Otterbein | |
| 4,977,753 A * | 12/1990 | Maisotsenko et al. | .......... 62/121 |
| 5,187,946 A * | 2/1993 | Rotenberg et al. | ............... 62/314 |
| 5,248,454 A | 9/1993 | Thomas | |
| 5,301,518 A * | 4/1994 | Morozov et al. | ................. 62/305 |
| 5,718,848 A * | 2/1998 | James | ........................... 261/128 |
| 6,338,258 B1 | 1/2002 | Lee et al. | |
| 6,497,107 B2 * | 12/2002 | Maisotsenko et al. | .......... 62/121 |
| 6,581,402 B2 | 6/2003 | Maisotsenko et al. | |
| 7,093,452 B2 * | 8/2006 | Chee et al. | ....................... 62/175 |
| 7,197,887 B2 * | 4/2007 | Maisotsenko et al. | .......... 62/121 |

FOREIGN PATENT DOCUMENTS

| | | |
|---|---|---|
| DE | 9107782 U1 | 10/1991 |
| DE | 4321743 A1 | 3/1994 |
| EP | 0563474 A1 | 10/1993 |
| EP | 0661502 A2 | 6/1995 |
| FR | 2322644 B3 | 6/1979 |
| JP | 62252890 A2 | 11/1987 |
| JP | 08219504 A | 8/1996 |
| JP | 2003148894 B2 | 6/2007 |

(Continued)

*Primary Examiner* — Charles Bushey
(74) *Attorney, Agent, or Firm* — Coraline J. Haitjema; David P. Owen; Hoyng Monegier LLP (57) ABSTRACT

A heat exchange laminate comprises a formable carrier layer at least partially covered with a flexible liquid retaining layer having an open structure. By forming such a laminate of two layers, desired properties such as the spatial distribution of the liquid retaining layer, can be imparted to the heat exchange laminate prior to forming. The laminate may then be conveniently formed into any desired shape by known manufacturing procedures for incorporation into a heat exchanger. The laminate may be used to cool a first fluid by evaporation of a liquid into a second fluid operating at or near its saturation point.

23 Claims, 5 Drawing Sheets

FOREIGN PATENT DOCUMENTS

| | | |
|---|---|---|
| SU | 626329 A | 9/1978 |
| WO | 0157459 A1 | 8/2001 |
| WO | 03064153 A1 | 8/2003 |
| WO | 2004040219 A1 | 5/2004 |
| WO | 2004065857 A1 | 8/2004 |
| WO | 2005019739 A1 | 3/2005 |

* cited by examiner

HEAT EXCHANGE LAMINATE

BACKGROUND OF THE INVENTION

1. Field of the Invention

The present invention relates to a laminate for a heat exchanger and more particularly to a laminate comprising a liquid retaining layer for use in evaporative type heat exchangers. The invention also relates to a heat exchanger formed from the laminate and to a method of producing such a heat exchanger.

2. Description of the Related Art

There are a number of situations in which heat exchange in combination with the evaporation of a liquid may be desirable. One such situation is in the humidification of dry air. When air is heated, its ability to carry moisture increases and thus its relative humidity decreases if no further moisture is added. In cold periods, heating installations providing warm air to a building may require some form of humidification in order to compensate for this decrease in relative humidity. In general, relative humidity of less than 50% has been recognised as being undesirable. One way of increasing humidity is to provide water to a porous medium within an air treatment unit. Warm air passing over the medium can pick up additional moisture and transport it into the building. In doing so, heat exchange from the porous medium and its support also takes place. Humidifying devices may be provided independently or may be combined with heaters, heat recovery devices, heat pumps, air conditioners and also with dew-point coolers as described below.

Another situation where heat exchange in combination with evaporation of a liquid is desirable is the evaporative cooler. The principle of evaporative heat exchange has been used for many centuries in various traditional forms. In general, by providing a liquid to one surface of a heat exchange plate and passing a gas e.g. air across the surface, evaporation of the liquid from the surface may take place. The evaporation of the liquid to a vapour requires the addition of considerable heat—namely the latent heat of evaporation. This heat may be supplied by the heat exchange plate and in so doing, will serve to cool it. In the following, although reference will be made to evaporative coolers working with water, air and water vapour, it will be understood that the principles are in general equally applicable to other heat exchange media.

A particular form of evaporative heat exchanger is known as a dew-point cooler. A dew-point cooler attempts to bring down the temperature of a product air stream to as close to the dew point temperature as possible. For air at a given absolute humidity, the dew point is the temperature at which the air reaches a relative humidity of 100%, at which point it is saturated and can absorb no further moisture. The heat is removed from the product air stream by evaporation of a quantity of liquid into another working air stream. Such a process is theoretically extremely efficient and requires no compressor, as is the case for conventional refrigeration cycles. Many attempts have been made to realise such cycles but practical considerations have caused great difficulties in approaching the dew point over most temperature ranges. In the following, the term dew-point cooler will be used to refer to devices which cool a fluid to at or near its initial dew point by heat transfer to cause evaporation of a liquid into a working fluid operating at or near its saturation point One known form of dew-point cooler operates in counter flow and uses a portion of the product air stream as the working air stream. In simple terms, air flows over a first side of a heat exchange element and is cooled by heat transfer to the element. A portion of the air is diverted back over the second side of the heat exchange element. The second side of the heat exchange element is provided with a supply of water and heat transfer from the heat exchange element to the water causes it to evaporate into the working air stream. Evaporation of water into the working stream requires substantial heat input corresponding to the latent heat of evaporation of water. A device of this type is known from U.S. Pat. No. 4,976,113 A to Gershuni et al. Another device known from U.S. Pat. No. 6,581,402 A to Maisotsenko et al, describes an alternative arrangement of a dew-point cooler in a cross flow configuration. The contents of both of these disclosures are hereby incorporated by reference in their entirety.

It is believed that the supply of liquid to the wet second side of such a cooler is critical in achieving adequate cooling down to close to the dew point. Known coolers have in the past covered the wet side completely with a porous water-absorbent layer. If the air leaving the first side were at the dew point, as it returned across the second wet side, it would initially be unable to take up further moisture since it would already be saturated. It should first be warmed up by thermal input to move away from the saturation line. Only at that point can further moisture be absorbed with a corresponding transfer of latent heat. The presence of a thick porous layer on the wet side however inhibits direct heat transfer from the heat exchange element to the air. For this reason, known coolers rarely descend below the wet bulb temperature of the ambient air. Whilst not wishing to be bound by theory, applicant believes that successful cooling to the dew point can only be achieved in this type of device by providing incremental and repeated alternate thermal heat transfer followed by latent heat transfer. In this way, each time the air absorbs a quantity of water it returns to the saturation line and must be warmed again by direct heat transfer before further water can be absorbed.

It is also believed that to achieve effective cooling, the water activity of the material surface of the wet side must be high whereby it can easily give up its moisture. Water activity is defined by the ratio of the tendency of the material to release water to that of water itself. Thus a surface with a water activity of 1 will easily give up all its water by evaporation into an air flow across the surface while a surface with a water activity of 0 will not release any water under the same circumstances. In the following, reference to water activity is also intended to apply to similar activity of other liquids used instead of water. A smooth metal surface such as aluminium has high water activity and will thus easily give up water. Unfortunately however, it is not good at retaining water and cannot provide an effective buffer of water for evaporation.

It should be noted at this point, that for dew-point coolers, there is an advantage in retaining or buffering water provided to the wet side during periodic irrigations. If the wet side of a dew-point cooler is irrigated, the presence of excess water in the working air stream will cause the temperature to rise from the dew-point to the wet bulb temperature. This is because the excess water causes adiabatic cooling of the working air stream by evaporation of water droplets in the air stream itself rather than by evaporation from the heat exchange wall. Once the irrigated water has been taken up by the surface and any excess has drained away, the temperature can return again to the dew-point. The water taken up by the surface must be sufficient for the dew-point cooler to continue to operate for a period of time until the next irrigation. The ideal liquid retaining layer should thus be able to retain or buffer a large quantity of liquid but should also give it up again easily on evaporation.

A device is known from Dutch patent NL1018735, the content of which is hereby incorporated by reference in its entirety, in which a layer of Portland cement is used to coat the fins of a heat exchanger. Although such a layer has been found to have excellent water activity and water buffering characteristics as a result of its open structure, it nevertheless displays certain disadvantages: it is relatively heavy; it is susceptible to flaking and powdering especially if the carrier layer on which it is formed is subjected to shook or bending; and it is inconvenient to apply in a clean manufacturing environment. In particular, the cement coating must be applied to the formed product, since once coated, the material forming the heat exchanger can no longer be formed. Applying a layer of a desired thickness distribution to a complex shape is difficult and the prior art cement coatings have been found to show undesirable thickness variation.

BRIEF SUMMARY OF THE INVENTION

According to the present invention, an improved heat exchange laminate is provided comprising a formable carrier layer at least partially covered with a flexible liquid retaining layer having an open structure such that in use, a heat exchange medium can directly contact the carrier layer through the open structure of the liquid retaining layer. By forming such a laminate of two layers, desired properties such as the spatial distribution of the liquid retaining layer, can be imparted to the heat exchange laminate prior to forming. The laminate may then be conveniently formed into any desired shape by known manufacturing procedures. By providing the liquid retaining layer with an open structure, the ability of the heat exchanger to transfer both thermal heat and latent heat to a fluid medium flowing over it is enhanced. The open structure may comprise spaces between the fibres of a fibrous material forming the liquid retaining layer. Such a fibrous material may be a woven or non-woven layer having an open structure. In particular, knitting or other knotting techniques have been found extremely effective in producing an open structure having sufficient height to buffer a considerable quantity of liquid.

The fibrous material may be attached to the carrier by adhesives or other similar methods. Preferably, the adhesive and the fibrous material should be such that delaminating does not take place on forming of the laminate into a desired shape. In the case of corrugation of the laminate, it may for instance be desirable to align the weave of a woven fibrous material with the intended corrugation. Additionally, where adhesive is used, the adhesive may be chosen to enhance the properties of the carrier layer or liquid retaining layer. Thus the adhesive may be chosen to have water-retaining properties or heat conducting properties, or both and may thus be considered to form a part of either of these layers. Adhesive may be provided on both sides of the carrier layer prior to or during the lamination process. The adhesive on a first side of the carrier layer may serve to attach the liquid retaining layer while the adhesive on a second side may serve to attach the formed laminate to a further heat exchange element such as a membrane or to itself to form a tube. Preferably at least the adhesive on the second side of the carrier layer is a heat activated adhesive.

According to a particularly advantageous embodiment of the invention a suitable fibrous material may comprise a mixture of polyester and viscose fibres. Alternatively, polyamide coated polyester fibres may be used. For use with water in a dew-point cooler, these fibres have been found to have both excellent water retention and high water activity and can retain a sufficient buffer of water to allow for intermittent water supply. Preferably the fibres should have diameters of between 10 microns and 40 microns, most preferably approximately 30 microns.

In an alternative embodiment of the invention, the heat exchange laminate may additionally or alternatively comprise covered and uncovered areas of the carrier layer, possibly in the form of a repeating pattern of bands or ribs of liquid retaining material followed by bands of uncovered carrier layer. The covered areas may be covered by the fibrous materials mentioned above or may be covered by alternative liquid retaining materials. Ideally, for use with water, such materials should have high water activity such that water is easily released where necessary. Preferably, the water should be retained primarily by surface tension effects. Alternatively, materials exhibiting weak hygroscopic and hydrophilic effects maybe used e.g. in the form of coatings such as polyurethane. Such coatings may be brought on to the carrier layer in various different ways including painting, spraying, printing, transferring and the like. Of course, for use with evaporative media other than water or for use with gases other than air, other materials may be selected In a preferred embodiment of the invention the carrier layer comprises soft annealed aluminium. The aluminium may be in the form of a foil having a thickness of between 30 and 150 microns. More preferably, the foil has a thickness of between 50 and 100 microns, ideally about 70 microns. One of the major advantages of such aluminium is that it is relatively cheap and very easy to form. It is also extremely light yet structurally very strong. Copper may also be used but is somewhat heavier. Other metals may also be considered depending upon price and weight considerations and also on the area of intended use. The use of a good heat conductor such as a metal e.g. aluminium, is extremely important where the laminate is required to conduct heat in the plane of the laminate. This may be the case when the laminate is formed into fins for mounting on a first side of a membrane separating a first fluid stream from a second fluid stream. In such a case the fins serve to effectively increase the surface area of the first side of the heat exchanger. Further fins may also be provided on the second side of the membrane. The further fins may, if desirable, also be formed from a laminate according to the invention. If aluminium is used as the carrier layer, the use of adhesive bonding may require a primer. Primers may also be required for other materials that are difficult to adhere.

If heat conduction in the plane of the laminate is not intended or is to be avoided, the carrier layer may be formed of a poor thermal conductor. This may be the case where the laminate is formed as a membrane separating a first fluid stream from a second fluid stream and is only intended to transfer heat across itself from the first stream to the second stream. In this case, the carrier may be formed of a formable plastics material and forming may take place by thermoforming, thermosetting, curing or any other method of producing a permanent or semi-permanent deformation.

Advantageously, for all of the above-mentioned laminates, the liquid retaining layer should be relatively thin to ensure good heat transfer to the carrier layer. Ideally it is believed that the average thickness of the liquid retaining layer should be less than 50 microns. Preferably, less than 20 microns and even more preferably, less than 10 microns. In referring to the thickness of the liquid retaining layer, reference is made to the average thickness, taking into account the distribution of covered and uncovered areas or the otherwise open structure of the layer. Thus, a liquid retaining layer with a cover to space ratio of 50% and a thickness of 40 microns would be considered to have an average thickness of 20 microns. If the liquid retaining material additionally had an open fibrous structure, then the average thickness of the layer would be proportionally less than 20 microns.

According to a yet further aspect of the present invention there is further provided a heat exchange element formed from such a heat exchange laminate. Such a heat exchange laminate may be corrugated to form a series of elongate fins. The fins may be affixed to a heat exchange membrane as surface area increasing elements or may themselves be used to form the membrane or channel defining the fluid flow through a heat exchanger such as a dew-point cooler. If the fins are affixed to a heat exchange membrane as surface area increasing elements, they may additionally be provided with louvres. It has been found that the use of such louvres is extremely advantageous in the case of a carrier provided with a liquid retaining layer on only a first surface. In use, the louvres may serve to guide fluid flow from the first surface to the second surface and vice-versa. Since the second surface is not covered by the liquid retaining layer, direct thermal heat transfer from the carrier layer to the fluid is enhanced. In such a case where the fluid flows alternately over both sides of the heat exchange laminate, the distribution of the liquid retaining layer on both surfaces of the carrier layer may form part of the determination of the ratio of open structure and the effective average thickness of the water retaining layer.

According to a particular advantage of the present laminate, the heat exchange element may comprise a heat exchange laminate having an open structured liquid retaining layer on both surfaces of the carrier layer. Such a heat exchange element is extremely versatile for use in evaporative type heat exchangers and dew-point coolers. Because of the open structure, both sides of the laminate can function either as a wet side or as a dry side, depending upon the direction of flow and the supply of water. This allows the use of a dew-point cooler as a heat recovery element during e.g. cold periods and also permits humidification of the incoming air stream. In this context, a particular advantage of the laminate according to the invention lies in the ability of the water retaining layer to retain and transport water formed by condensation on the cooling side of such a heat recovery element. In the past, such water has tended to form as droplets which could cause choking or restriction of the heat exchange elements. The presence of a liquid retaining layer according to the present invention ensures that a tin film of water is retained, thus optimising heat transfer, while excess water is drained away. The recovered water may subsequently be supplied to the heated side for humidification purposes.

According to a yet further aspect of the present invention there is provided a method of manufacturing a heat exchange element comprising providing a heat exchange laminate comprising a formable carrier layer at least partially covered with a flexible liquid retaining layer and forming the laminate into a heat exchange element. By first providing the laminate and then forming it into the desired shape it is possible to achieve the desired configuration of the liquid retaining layer. Once the heat exchanger has been formed into a complex shape, it is otherwise difficult to attach the liquid retaining layer in an effective and controllable manner.

Preferably the laminate is formed into a plurality of elongate fins. If the carrier layer is formed of a metal e.g. aluminium, such fins may easily be formed by roll forming machines. The process of forming may also include the step of forming louvres in or through the fins, These may help to further enhance heat transfer by breaking up the various boundary layers and may also serve to direct flow from one side of the plate to the other. Other flow break up means may also be formed including dimples, ridges, grooves etc. In order to be able to effectively form such fins, louvres and other break up means, it is important that the carrier layer and liquid retaining layer are well bonded together to prevent unwanted delaminating or other disturbance to the integrity of the laminate. If louvres are formed through the laminate, the forming may also include cutting of the carrier layer or the liquid retaining layer or both.

In an advantageous embodiment of the method the laminate may be attached to a first surface of a membrane for heat transfer thereto. If the laminate is corrugated into fins, the base of each fin may be attached to the membrane preferably by adhesive. Prior art heat exchangers have generally been formed by soldering and brazing techniques. According to an important development of the present invention, the joining of the fins to the membrane by adhesive may permit a rapid, inexpensive and light assembly. In particular, heat and pressure activated adhesives are favoured which may be provided as an integral part of the laminate or the membrane prior to forming and joining.

According to a yet further advantageous embodiment of the invention, the method further comprises providing further fins and attaching them to a second surface of the membrane for heat transfer thereto. A tubular structure may then be formed with the elongate fins on an exterior surface of the tubular structure and the further fins on an internal surface of the tubular structure or vice versa. The tubular structure may be formed by placing two similar membranes together and sealing them along parallel edges. Alternatively, a single membrane may be folded or rolled into a tubular structure and sealed to itself. Preferably, the fins are generally aligned with the axis of the tubular structure.

BRIEF DESCRIPTION OF THE DRAWINGS

Embodiments of the present invention will now be described, by way of example only, having reference to the accompanying figures, in which.

DESCRIPTION OF ILLUSTRATIVE EMBODIMENTS

Figure 1:
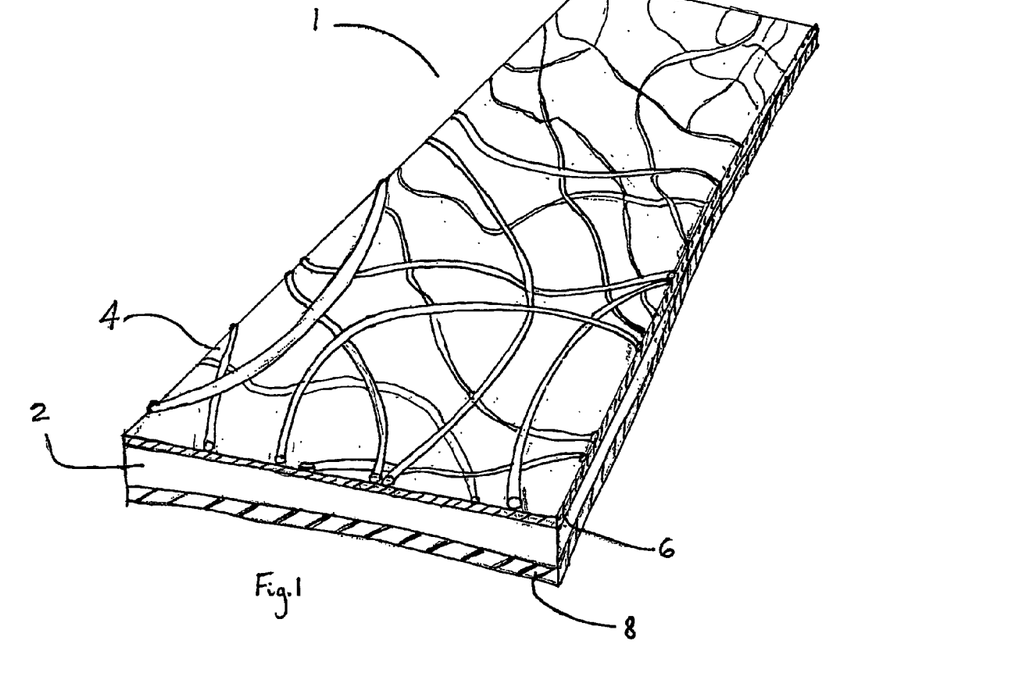
FIG. 1 is a perspective view of a section of heat exchange laminate according to one aspect of the present invention.

According to FIG. 1, there is depicted a section of a heat exchange laminate 1 illustrating the individual layers. Laminate 1 comprises a carrier layer 2 covered over its first surface by a liquid retaining layer 4. A first adhesive 6 is provided between the carrier layer and the liquid retaining layer. A second adhesive 8 is also provided on the second surface of the carrier layer 2. In this embodiment, the presence of second adhesive 8 is optional and its function will be described in further detail below.

Carrier layer 2 is preferably formed of soft annealed aluminium having a thickness of approximately 70 microns. This material has been found to be extremely advantageous as it is light, easily formable and has good conductivity. The aluminium is provided on both surfaces with a primer (not shown) to ensure adequate bonding with the adhesives 6, 8.

The primer is preferably a PVC based primer and may be coloured to provide a desirable appearance to the laminate 1. Further coatings e.g. to provide protection against corrosion may also be included. Although aluminium is depicted in this embodiment, other metals having similar properties may also be used including copper, tin, zinc and other alloys and combinations. Alternatively, plastics and composite materials including carbon and aramide fibres may be used. The selection of the above materials will be evident to the skilled man and will be determined by the particular conditions under which the heat exchanger is intended to operate.

The liquid retaining layer 4 is formed from a fibrous nonwoven material. Although reference is made to a liquid retaining surface, it is clearly understood that the surface is in fact a liquid retaining and releasing surface. As can be seen from FIG. 1, the layer has a very open structure such that the carrier layer 2 can be clearly seen through the spaces between the fibres 10. An exemplary material for forming the water retaining layer is a 20 g/m2 polyester/viscose 50/50 blend, available from Lantor B.V. in The Netherlands. Another exemplary material is a 30 g/m2 polyamide coated polyester fibre available under the name Colback™ from Colbond N.V. in The Netherlands. Other materials having similar properties including synthetic and natural fibres such as wool may also be used. Where necessary, the liquid retaining layer may be coated or otherwise treated to provide anti bacterial or other anti fouling properties.

Figure 2:
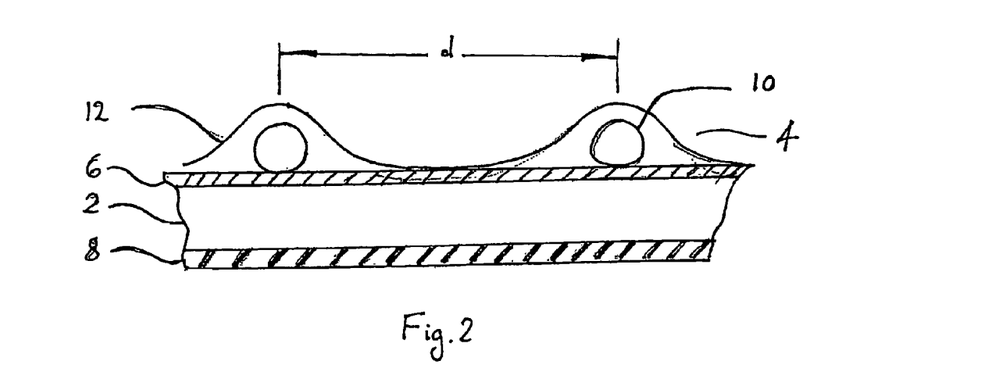
FIG. 2 is a detailed cross-section through the heat exchange laminate of FIG. 1 illustrating the retention of water.

In FIGS. 1 and 2, the first adhesive 6 is provided as a thin layer over the entire area of the laminate 1. For use with aluminium and Lantor fibres as mentioned above, a 2 micron layer of a two component polyurethane adhesive has been found to provide excellent results. When present as such a thin layer, its effect on heat transfer to the carrier layer is negligible. It is however also possible to provide first adhesive 6 only in the area of the individual fibres 10. In this case it may also be considered to form part of the open structure, whereby both the liquid and heat exchange medium can come into direct contact with the carrier layer 2. This may be achieved by coating the fibres 10 of the liquid retaining layer 4 with the second adhesive 6 prior to laminating with the carrier layer 2.

FIG. 2 shows in greater detail how the liquid retaining layer 4 is effective to buffer a quantity of liquid for subsequent evaporation. FIG. 2 shows carrier layer 2 provided with second adhesive layer 8 on its lower surface. Two fibres 10 forming part of the liquid retaining layer 4 are depicted on its upper surface adhered by first adhesive layer 6. Also shown in FIG. 2 is a liquid droplet 12. The liquid droplet 12 is effectively retained by the fibres 10 and prevented from dripping off the surface even if the laminate 1 is held in a vertical position. Various mechanisms can be used to improve the tendency of the fibres to retain liquid. For water, the retention should preferably be primarily based on surface tension effects, since these are accompanied by relatively high water activity.

From FIG. 2, the extent of the open structure can also be seen. The fibres 10 are spaced apart by a distance d, which in this case corresponds substantially to the extension of the liquid droplet 12 retained by a fibre 10. The extension of the liquid droplet 12 will in practice depend upon various factors including: the shape and dimensions of the individual fibres 10; the nature of the surfaces of the fibres 10, the adhesive 6 and the carrier layer 2; the liquid 12 used; and the nature and condition of the gas flowing across the heat exchanger. The choice of the distance d will also depend upon the properties desired from the laminate 1. If water activity is of primary importance, the spacing d may be chosen to be greater than the extension of the droplet 12. If increasing the buffering capacity is of primary importance, the spacing d may be chosen to be substantially smaller than the droplet extension. In practice, for use with water on an aluminium carrier coated with two component polyurethane adhesive, it has been found that an average spacing d of about 100 microns is desirable. The liquid retaining layer may thus be adapted according to the conditions expected e.g. by providing greater buffer capacity for dryer climates.

Figure 3:
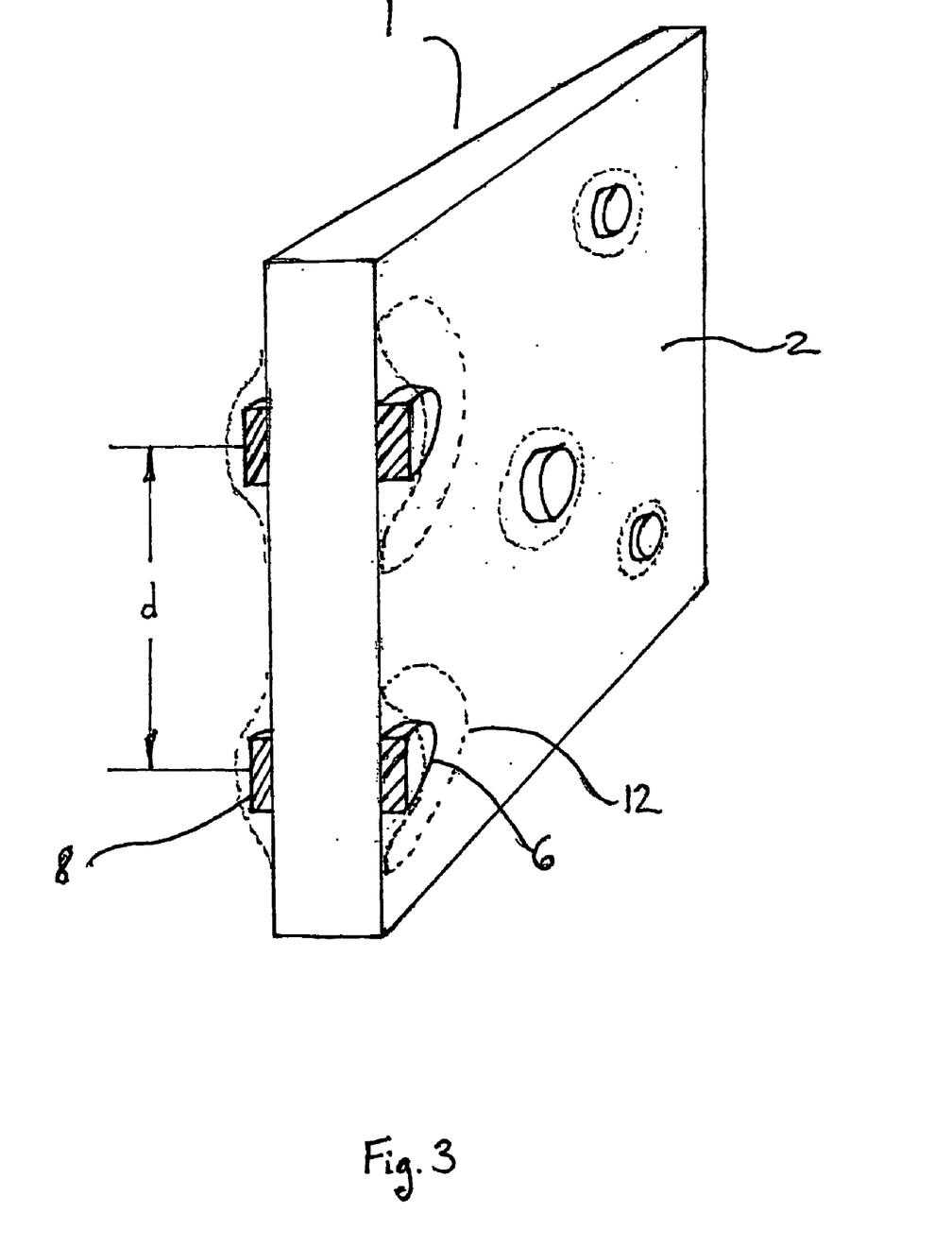
FIG. 3 is a perspective view of an alternative heat exchange laminate according to another aspect of the present invention.

FIG. 3 shows an alternative version of the laminate 1 in a vertical position. Like elements will be designated with the same reference numerals as before. Laminate 1 comprises a carrier layer 2, provided on a first surface with isolated regions of adhesive 6. Adhesive 8 is similarly provided on the second surface of the cater layer in the form of isolated regions. In this embodiment, the adhesives 6 and 8 themselves constitutes water retaining layers. Similarly to the fibre spacing in the case of FIG. 2, the isolated regions of adhesive are spaced a distance d apart. In this case however, it can be seen that the distance d is substantially smaller than the dimension of a liquid droplet 12 leading to lower buffer capacity but higher water activity. Various different methods of forming the adhesive liquid retaining layers are possible including spraying, transferring and printing. A preferred method uses an inkjet printing technique. Clearly, the isolated regions may be provided in any desired shape and may be arranged in any desired pattern. While reference has been made to isolated regions, interlinked regions providing the desired open structure may also be used. Furthermore, although adhesive has been mentioned, other structures or protrusions on the surface of the carrier layer may provide the same water retaining function. Similar effects may be achieved by surface treatment of the carrier layer e.g. by etching or the like to produce liquid retaining elements at an upper layer of the surface.

Surprisingly it has been found that the height of a protrusion such as the adhesive 6, 8 of FIG. 3, or the fibres 10 of FIGS. 1 and 2 is significant in determining the quantity of water retained. By using knitting techniques to form the material of the liquid retaining layer 4, increased buffering capacity may be achieved if the knitting method is optimised to increase the height or thickness of the layer without reducing its open structure.

Figure 4:
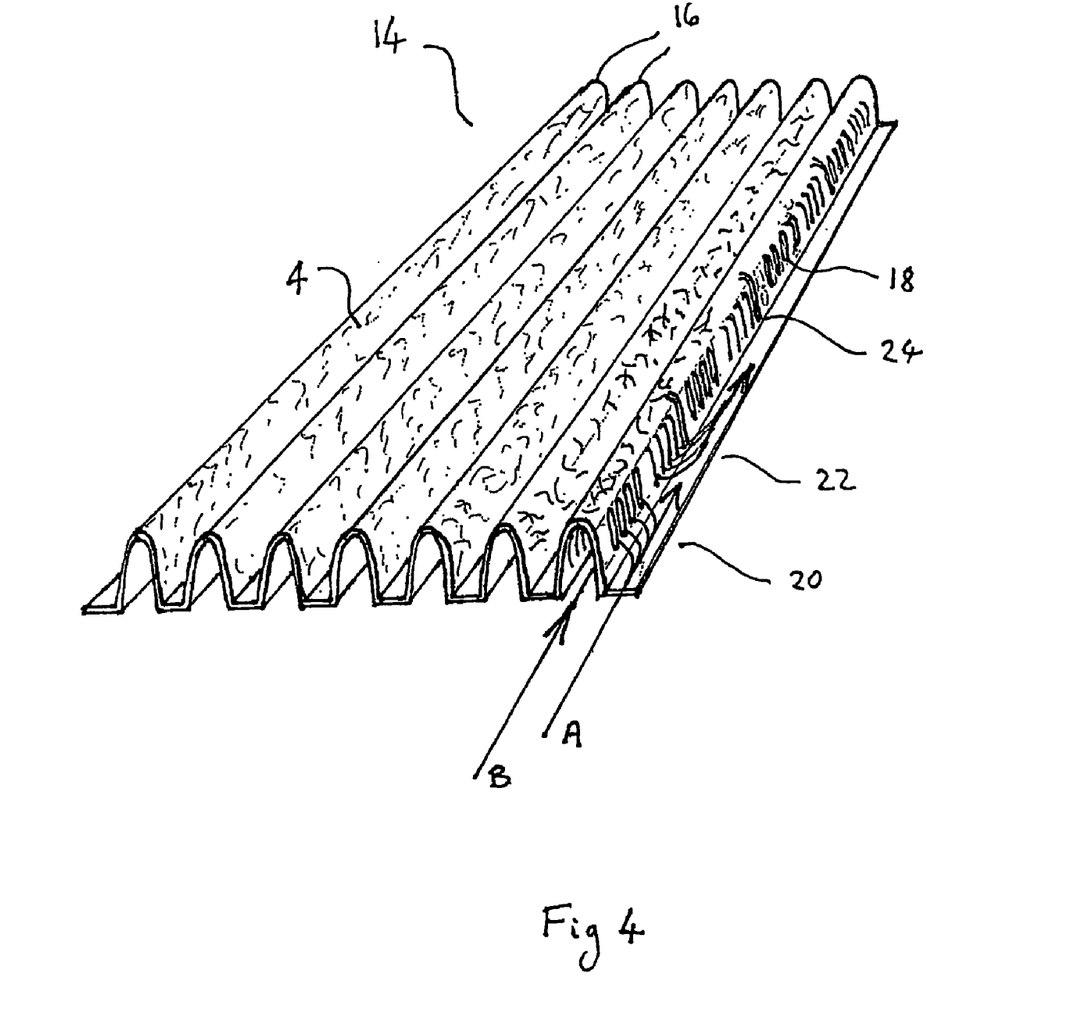
FIG. 4 is a perspective view of a heat exchange element according to the present invention.

FIG. 4 shows a section of heat exchange laminate 1 according to FIG. 1, formed into a heat exchange element 14. The heat exchange element 14 comprises a series of fins 16 having the liquid retaining layer 4 on a first upper surface thereof. The fins 16 are each provided with louvres 18 in the form of elongate slots penetrating through the laminate 1 (only the louvres on the first fin are shown). The louvres 18 are arranged in groups. A first group 20 serves to direct flow into the surface, while a second group 22 directs flow out of the surface. Thus, some of the air flowing along the heat exchange element 14 in the direction of arrow A will be directed through the laminate towards the lower second surface. Air following the direction of arrow B will be directed outwardly by the second group of louvres. In this way, the air alternately flows over the first surface, where it can receive moisture by evaporation from the liquid retaining layer, followed by the second surface where it can receive direct thermal energy to raise its temperature.

In addition to their function in directing flow between the surfaces of the heat exchange element 14, louvres 18 also serve to break up the boundary layers that may develop as air flows along the surfaces. Other break up elements may be provided in addition or instead of the louvres 18. It is noted that in a heat exchange laminate 1 according to the embodiment described in FIG. 2, the water retaining elements may additionally be designed to break up the boundary layer.

Furthermore, while the fins 16 of FIG. 4 are straight, curvilinear or zig-zag fins may also be produced. It is believed that such fin shapes are advantageous in breaking up the boundary layers that develop in flow along the fins, since each time the fin changes direction, turbulent flow is reestablished. Various cross-sectional shapes are also possible for the fins, including corrugations of square, trapezoidal, rectangular, bell and sine wave shapes. The precise shape will depend on various factors, one of which may be the ability of the liquid retaining layer 4 to resist bending.

In addition to louvres 18, heat exchange element 14 is provided with conduction bridges 24. These bridges 24 are in the form of cuts through the laminate 1 over substantially the whole height of the fin 16. They serve to prevent unwanted transport of heat along the heat exchange element 14 in the direction of the air flow.

The heat exchange element 14 is preferably formed using standard corrugation techniques. An appropriate width roll of the prepared laminate 1 may be fed through a pair of corrugated rollers which can form the fins 16, louvres 18 and heat bridges 24 in a single pass. The resulting product may then be cut into suitably sized heat exchange elements 14 for further processing.

Figure 5:
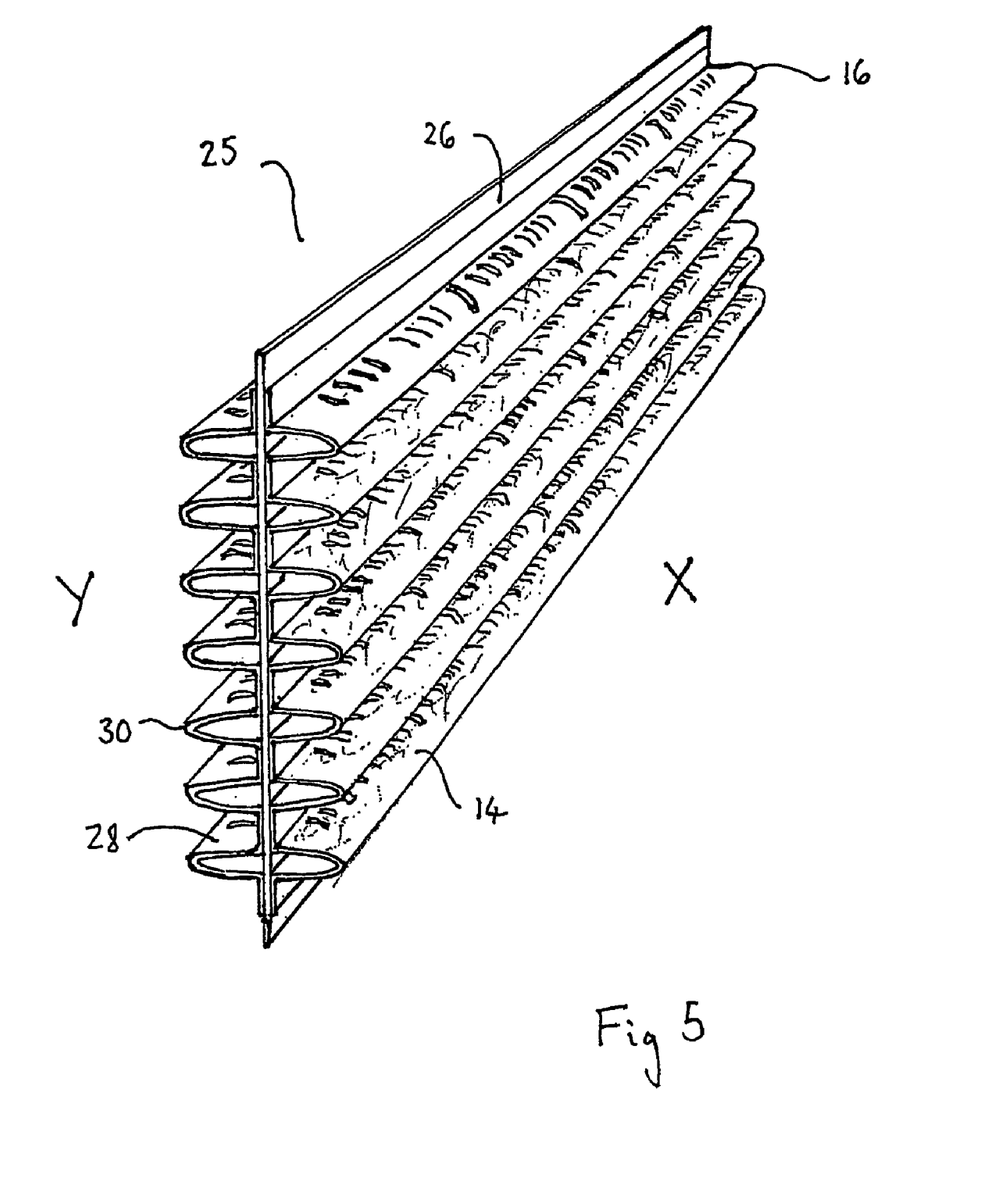
FIG. 5 is a perspective view of a construction using the heat exchange element according to FIG. 4.

FIG. 5 shows a possible construction 25 using the heat exchange element 14 of FIG. 4. According to FIG. 5 the heat exchange element 14 is attached to a first surface of a membrane 26. The membrane 26 is provided on its second surface with a second heat exchange element 28, which in the present embodiment is provided with fins 30 similarly shaped to the heat exchange element 14 and which may also be provided with louvres and conduction bridges. The second heat exchange element 28 differs from the first heat exchange element 14 in that it does not comprise a liquid retaining layer. The membrane 26 is generally impervious to the air or other fluid intended for use in the heat exchanger and serves to define a first fluid region X and a second fluid region Y. For constructional reasons, a preferred material for the membrane is soft annealed aluminium of approximately 70 micron gauge.

As described above, the heat exchange laminate 1 forming heat exchange element 14 may have a second adhesive 8 on its second surface. This second adhesive 8 is preferably a heat seal adhesive such as a PVC/polyacrylate based adhesive. The membrane 26 is also provided with a similar or compatible heat seal adhesive on its surface facing the heat exchange element 14 whereby both membrane 26 and element 14 may be easily joined together under appropriate heat and pressure. The facing surfaces of second heat exchange element 28 and membrane 26 are also provided with similar heat seal adhesive and may be joined together in the same way. As can be seen from FIG. 5, the heat exchange elements 14 and 26 are joined in such a way that only the troughs of the fins 16, 30 are adhered to the membrane 26. Furthermore, the fins 16 and 30 are directly aligned with one another through the membrane 26.

In use, the fluid region X may serve as the wet side of an evaporative heat exchanger or humidifying device, while region Y serves as the dry side. The fins 16 comprising laminate 1 can take up a quantity of water in the liquid retaining layer 4. Non-saturated air flowing across the surface can absorb water by evaporation out of the laminate 1. In so doing, laminate 1 loses a quantity of heat corresponding to the latent heat of evaporation of the water lost. To maintain equilibrium, heat must be provided to the laminate 1. For a carrier layer 2 of aluminium, this takes place by conduction in the plane of the laminate from the membrane 26. This heat must in turn be supplied by the cooling of dry fluid in region Y and by conduction of this heat through the fins 30 of second heat exchange element 28 to the membrane 26. The alignment of the fins 11, 30 improves heat transfer from one element to the other through the membrane 26.

In the illustrated embodiment only a single side of the fins 16 is provided with a liquid retaining layer. It is however also possible to provide a liquid retaining layer on other surfaces too. Membrane 26 may for instance also be formed of heat exchange laminate 1, having the liquid retaining layer on its first surface facing the heat exchange element 14. It is also possible to use the heat exchange laminate 1 for forming the second heat exchange element 28 and to provide liquid retaining layers on both sides thereof. As an advantageous consequence of the open structure according to one aspect of the present invention, the liquid retaining side of the laminate can function well as either a wet side or as a dry side of a heat exchanger. For laminates provided with a liquid retaining layer on both surfaces, additional measures and adhesive layers may be required to ensure joining to another surface.

In the illustrated embodiment, the fins 16 and 30 are arranged to lie parallel to one another such that the heat exchanger may operate in counter flow. For use as a dew-point cooler, the membrane may be provided with channels allowing some or all of the fluid in the region Y to pass across the membrane to region X. Such channels may be in the form of orifices through the membrane. Other alternative arrangements are also possible with the two sets of fins angled with respect to each other for cross flow operation. For cross flow operation as a dew-point cooler, it may also be possible to provide orifices through the membrane between one or more of the fins 28 to serve as feeders for some or all of the channels between the fins 14 in the region X.

The construction 25 according to FIG. 5 may be integrated into a heat exchanger such as a dew-point cooler in many different ways. A number of like constructions 25 may be arranged parallel to one another to form a series of alternate fluid regions X and Y. Clearly, if a number of such constructions 25 are combined, more than two regions may be defined each being subjected to a different fluid. In an advantageous alternative, the construction 25 may be formed into a tubular structure by rolling or folding the membrane and heat sealing it to itself, whereby the region Y is located within the tube and the region X is located externally.

Figure 6:
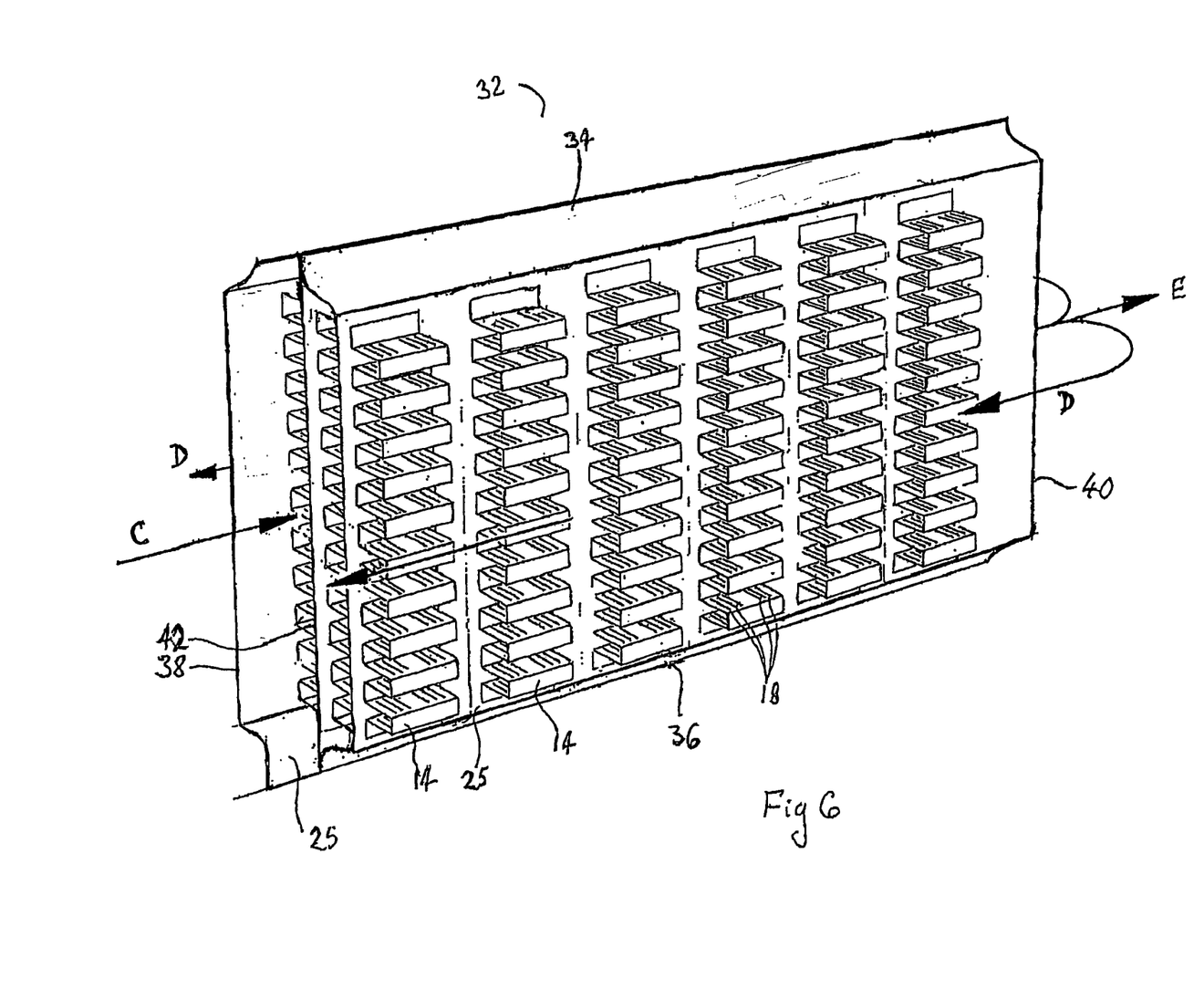
FIG. 6 is a perspective view of a tubular structure comprising a number of heat exchange elements according to FIG. 4.

FIG. 6 shows a possible tubular structure 32 that has been found particularly advantageous for the construction of dew-point coolers elements and heat recovery elements. Tubular structure 32 comprises a pair of constructions 25 comprising membranes 26 that have been joined to one another at upper and lower longitudinal edges 34, 36. Various methods for joining the edges 34, 36 may be used, but a preferred method for aluminium membranes 26 as described above is by heat sealing.

The constructions 25 are effectively connected in back to back relationship with the second heat exchange elements 28 on the inside and the heat exchange elements 14 with liquid retaining layer 4 on the outside. A reversal of this arrangement is also possible but would require water supply to the interior of the tubular structure 32 in order to wet the liquid retaining layer 4. As can be seen from FIG. 6, the outside of each membrane 26 is provided with a number of heat exchange elements 14, separated from one another by a short gap. This gap also serves as a form of conduction bridge to minimise heat conduction in the flow direction of the heat exchanger. The second heat exchange is arranged in a similar manner.

Also shown in FIG. 6 is an inlet extension 38 (partially cut away) and an outlet extension 40 for the interior of the tubular structure 32. Both extensions 38, 40 are formed from sections of the membranes 26 without heat exchange elements. A web 40 is also shown between the two constructions 25. The web 40 serves to improve structural stability and may be provided with holes to allow flow through it within the interior of the tubular structure 32.

In use as a dew-point cooler, one or more such tubular structures 32 are located within a suitable housing having an inlet communicating with the inlet extension and an outlet communicating with the outlet extension. Flow C through the tubular structure 32 may be induced by a fan provided at the inlet although other flow inducing means may also be used. By providing e.g. a flow restriction at the outlet and a connection between the outlet extension and the outside of the tubular structure 32, a portion of the flow D) maybe caused to recirculate in contraflow over the outside of the tubular structure 32. The remainder of the flow E exits to the outlet for cooling of the desired space. Liquid such as water supplied to the liquid retaining layer 4 by known water supply means will then evaporate into the recirculating flow D providing the necessary cooling to the flow C within the tubular structure 32. The recirculating flow D may then exhaust through a further exhaust opening provided in the housing.

A slight adaptation may be made for use also as a heat recovery device. The housing may then be provided with a further inlet and possibly a second fan or other flow inducing device. Whichever flow is intended to be heated may also be provided with water supply to an appropriate liquid retaining layer for humidification purposes. For heat recovery it is also particularly advantageous to provide both sides of the exchanger with laminates comprising liquid retaining layers according to the present invention, whereby condensation is retained and can be wicked away.

Although not shown, the formed heat exchange laminate itself may be used as both fin and impervious membrane. Thus, a pair of heat exchange elements similar to FIG. 4 but without open louvres may be connected back to back in the manner depicted in FIG. 6 to produce a tubular structure.

While the above examples illustrate preferred embodiments of the present invention it is noted that various other arrangements may also be considered which fall within the spirit and scope of the present invention as defined by the appended claims.

What is claimed is:

1. A dew-point cooler comprising a heat exchange element, the dew-point cooler being adapted to be operable in counter flow so that when in use a product air stream flows over a first side of the heat exchange element and is cooled by heat transfer to the element and a portion of the product air stream is diverted back over a second side of the heat exchange element, in use the second side of the heat exchange element being provided with a supply of water whereby heat transfer from the heat exchange element to the water causes it to evaporate into the air stream; wherein the heat exchange element comprises a heat conducting wall and a formed heat exchange laminate attached to the heat conducting wall, the formed heat exchange laminate comprising a formable carrier layer at least partially covered with a flexible liquid retaining layer having an open structure such that in use, a heat exchange medium can directly contact the carrier layer through the open structure of the liquid retaining layer.

2. The dew-point cooler according to claim 1, wherein the liquid retaining layer is a fibrous material and the open structure comprises spaces between the fibres.

3. The dew-point cooler according to claim 2, wherein the fibrous material is adhered to the carrier layer by an adhesive.

4. The dew-point cooler according to claim 3, wherein the fibrous material comprises a bonded mixture of polyester and viscose fibres.

5. The dew-point cooler according to claim 3, wherein the fibrous material comprises a woven or knitted fibrous layer.

6. The dew-point cooler according to claim 1 wherein the carrier layer comprises aluminium.

7. The dew-point cooler according to claim 1 wherein the liquid retaining layer has an average thickness of less than 50 microns.

8. The dew-point cooler according to claim 1, wherein the heat exchange laminate is corrugated to form a series of elongate fins.

9. The dew-point cooler according to claim 8 wherein the elongate fins are wave shaped in their elongate direction.

10. The dew-point cooler according to claim 8, wherein the fins are provided with louvres.

11. The dew-point cooler according to claim 1, wherein the liquid retaining layer is provided substantially only on a first side of the carrier layer.

12. The dew-point cooler according to claim 1 wherein the formed heat exchange laminate is attached to the heat conducting wall by adhesive.

13. The dew-point cooler according to claim 12 wherein the adhesive is a heat actuated adhesive applied to the carrier layer or the heat conducting wall.

14. The dew-point cooler according to claim 1 wherein the heat conducting wall is formed into a tubular structure.

15. The dew-point cooler according to claim 1, wherein the heat conducting wall also comprises a heat exchange laminate according to claim 1.

16. A method of manufacturing the dew-point cooler according to claim 1, comprising:
providing a heat exchange laminate comprising a formable carrier layer at least partially covered with a flexible liquid retaining layer having an open structure;
forming the laminate into a plurality of elongate fins; and
attaching the fins to a heat conducting wall for heat transfer thereto to form a heat exchange element.

17. The method according to claim 16 further comprising forming louvres in the fins.

18. The method according to claim 16, further comprising attaching the fins to a first surface of the heat conducting wall for heat transfer thereto.

19. The method according to claim 18 further comprising attaching further fins to a second surface of the heat conducting wall for heat transfer thereto.

20. The method according to claim 19 further comprising folding the heat conducting wall to form a tubular structure with the elongate fins on an exterior surface of the tubular structure and the further fins on an internal surface of the tubular structure.

21. The dew-point cooler according to claim 9 wherein the liquid retaining layer is provided substantially only on a first side of the carrier layer.

22. A dew-point cooler comprising a heat exchange element, the dew-point cooler being adapted to be operable in counter flow so that in use air flows over a first side of the heat exchange element and is cooled by heat transfer to the element and air flows over the second side of the element, in use the second side of the heat exchange element being provided with a supply of water whereby heat transfer from the heat exchange element to the water causes it to evaporate into the air stream; wherein the heat exchange element comprises a formed heat exchange laminate having a formable carrier layer at least partially covered with a flexible liquid retaining layer having an open structure such that in use, a heat exchange medium can directly contact the carrier layer through the open structure of the liquid retaining layer.

23. A dew point cooler comprising a heat exchange element; the heat exchange element comprising
  i) a first side forming a flowpath for an airstream;
  ii) a second side forming a flowpath for an airstream; and
  iii) a heat exchange laminate comprising a formable carrier layer at least partially covered with a flexible liquid retaining layer having an open structure such that in use, a heat exchange medium can directly contact the carrier layer through the open structure of the liquid retaining layer.

* * * * *